United States Patent [19]

Drew

[11] Patent Number: 5,762,246
[45] Date of Patent: Jun. 9, 1998

[54] VARIABLE POSITION COMPACT DISC STORAGE DEVICE FOR A VEHICLE VISOR

[75] Inventor: Terrence Martin Drew, Superior, Colo.

[73] Assignee: Case Logic, Inc., Longmont, Colo.

[21] Appl. No.: 635,603

[22] Filed: Apr. 22, 1996

[51] Int. Cl.⁶ ........................................ B60R 7/05
[52] U.S. Cl. .................. 224/312; 224/282; 224/553; 224/572; 206/308.1
[58] Field of Search .................. 224/312, 282, 224/572, 553; D12/417; 296/97.6; 206/308.1, 311, 312, 425

[56] References Cited

U.S. PATENT DOCUMENTS

| | | | |
|---|---|---|---|
| D. 294,660 | 3/1988 | Strongwater | D3/40 |
| D. 310,301 | 9/1990 | Burrow | D3/34 |
| D. 343,514 | 1/1994 | Underwood, Jr. | D3/40 |
| D. 354,471 | 1/1995 | Moseley | D12/191 |
| D. 362,159 | 9/1995 | Singh | D6/629 |
| 2,707,072 | 4/1955 | Sims | 224/42.42 |
| 3,016,262 | 1/1962 | Hunt | 296/97 |
| 3,809,428 | 5/1974 | Cohen | 296/97 C |
| 3,954,297 | 5/1976 | Linke et al. | 224/312 |
| 4,781,409 | 11/1988 | Harbison | 296/97.6 |
| 4,844,311 | 7/1989 | Kalen | 224/312 |
| 4,913,483 | 4/1990 | Jasso | 296/97.6 |
| 5,195,668 | 3/1993 | Kunes et al. | 224/312 |
| 5,301,856 | 4/1994 | Newsome | 224/312 |
| 5,329,947 | 7/1994 | Shikler | 132/304 |
| 5,379,929 | 1/1995 | Eskandry | 224/312 |
| 5,402,924 | 4/1995 | Gilson | 224/312 |
| 5,433,362 | 7/1995 | Battaglia | 224/312 |
| 5,590,827 | 1/1997 | Nimpoeno | 206/308.1 |

FOREIGN PATENT DOCUMENTS

| | | | |
|---|---|---|---|
| 2253822 | 9/1992 | United Kingdom | 296/37.6 |

OTHER PUBLICATIONS

"Samsonite Audio Access System"; Photoco Inc., 4347 Cranwood Pkwy, Cleveland, Ohio 44128; 1995 copyright Samsonite Corp.

*Primary Examiner*—Linda J. Sholl
*Attorney, Agent, or Firm*—Sheridan Ross P.C.

[57] ABSTRACT

The compact disc storage device of the present invention provides maximum storage capacity of compact discs while being interconnected to a visor, e.g. a sun-visor in an automobile. The invention allows the storage device to be temporarily pivoted on the sun-visor, for example, to expose a vanity mirror located on the sun-visor, without requiring the disconnection of the storage device from the sun-visor.

26 Claims, 4 Drawing Sheets

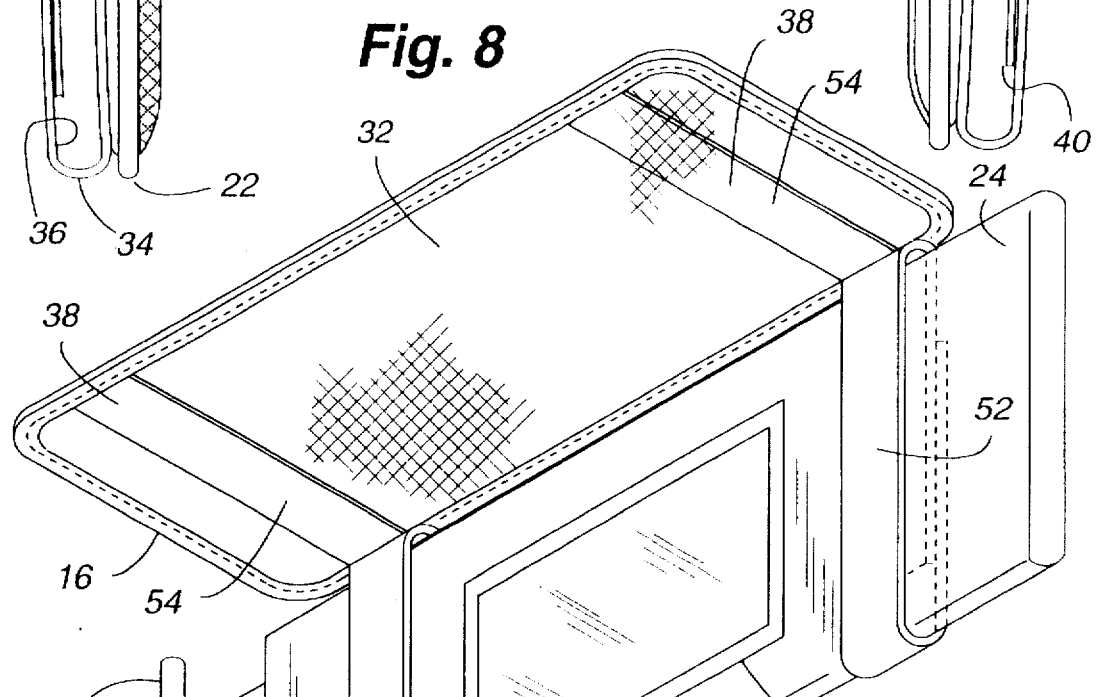

VARIABLE POSITION COMPACT DISC STORAGE DEVICE FOR A VEHICLE VISOR

FIELD OF THE INVENTION

The invention relates to a storage device used to store compact discs, and more particularly to a storage device which can be attached to a visor of a vehicle, such as an automobile. In a first position the apparatus provides convenient access to a plurality of compact discs, while in a second position the device is pivoted to allow access to a vanity mirror or other device located on the visor. In either the first or second positions the storage device remains operably interconnected to the visor.

BACKGROUND OF THE INVENTION

With the increasing use of compact disc players in automobiles and other vehicles there is a significant need for an apparatus which can store a plurality of compact discs in a convenient, easily accessible location. Furthermore, it is important that the storage device be located in a position which allows the driver to keep his eyes substantially on the road while making a compact disc selection for use in a compact disc player. Additionally, due to the limited space in an automobile, the storage device must be small enough to remain non-obstructive, yet hold a sufficient number of compact discs in a safe manner which will not scratch the playing surface.

One particular type of compact disc storage device is disclosed in U.S. Pat. No. D362,159 issued to Singh. The product disclosed in the Singh patent attaches to the visor of an automobile by wrapping entirely around the front and back of the visor. However, based on this method of attachment, it is impossible for the driver to view a vanity mirror located on the visor without completely removing the storage device from the visor.

Thus, a need exists for a compact disc storage device which is compact, allows easy removal and insertion of compact discs and other objects and which allows the driver to keep his eyes affixed to the road while making a CD selection. This device should additionally be made of materials which will not scratch or otherwise damage the playing surface of the compact disc. Finally, the storage device should allow for the use of the vanity mirror or other objects on the visor without requiring the complete removal of the storage device from the visor.

SUMMARY OF THE INVENTION

It is thus one aspect of the invention to provide a compact disc storage device for use in a vehicle such as a car, boat or truck which addresses the limitations of products currently known in the art by having the device attached directly to the visor. This configuration allows a driver of the vehicle to keep his eyes affixed in the general direction of movement while removing or inserting a compact disc from the storage device.

It is another aspect of the present invention to provide a compact disc storage device which can be interconnected to the visor in such a manner as to allow the device to be temporarily pivoted upward and away from the visor to allow viewing or use of a vanity mirror or any other substantially flat device which is interconnected to the visor. This pivotal rotation feature permits viewing of the vanity mirror without requiring the total removal of the storage device. Furthermore a fastener may be attached to the ceiling of the vehicle to engage an opposing fastener on the storage device to hold the device in an upright position.

One additional aspect of the invention is to orient each of the pockets which holds one or more compact discs in the same longitudinal direction, which optimizes the functional storage capacity and allows ease of removal and insertion of the compact discs. This feature further allows the driver of the vehicle to remove and insert a compact disc with one hand while looking forward and steering with the other hand.

In yet another aspect of the invention, a thin, non-scratching pliable material is used to construct the pockets which hold the compact discs. Thus, the playing surface of the compact discs are protected, and space is saved which allows the visor to be pivoted upward and against the ceiling of the vehicle when not in use.

In another aspect of the present invention a separate storage pocket is provided adjacent the pockets used to store the compact discs. This pocket can be constructed of a elastic, see-through mesh and accommodates the storage of spare keys, credit cards, a garage door opener, etc. A separate pocket for securing a pen or pencil to the storage device may additionally be attached for the drivers convenience.

BRIEF DESCRIPTION OF THE DRAWINGS

FIG. 6 is a left side view of the invention.

FIG. 7 is a right side view of the invention.

FIG. 8 is a right perspective view of the invention with environment depicting the storage device attached to a visor and pivoted in a position which permits the viewing of a vanity mirror.

FIG. 9 is a right partial perspective view of the invention showing an alternative embodiment for attaching the storage device to a visor.

DETAILED DESCRIPTION OF THE PREFERRED EMBODIMENT

The present invention including the preferred embodiments may be seen in FIGS. 1–9, which shows a compact disc storage device specifically designed for attachment to a vehicle visor and designed for use in one of two positions. In a first position the storage device is securely attached to a first side of a visor, allowing access for the insertion and removal of compact discs. In a second position the storage device may be pivoted upward and away from the visor to allow the user to use a vanity mirror or other substantially flat object positioned on the visor.

Figure 1:
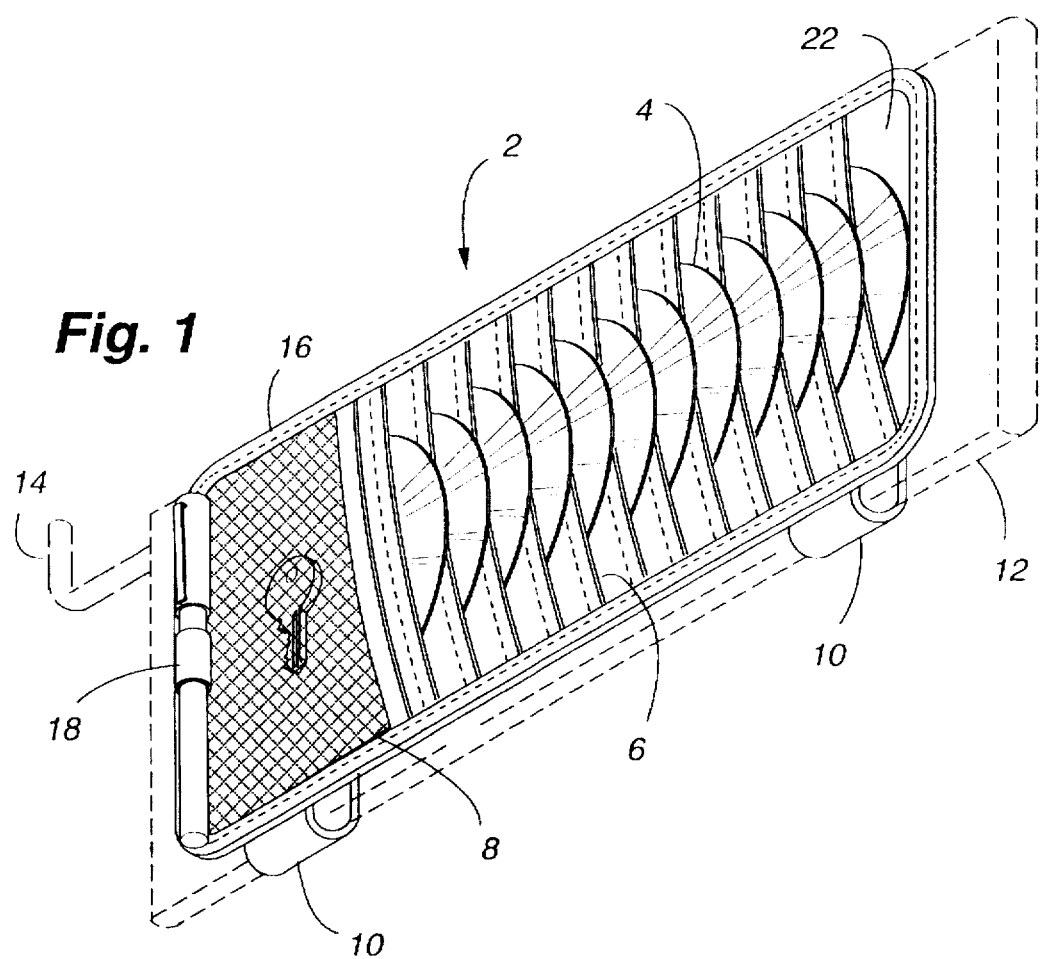
FIG. 1 is a front perspective view of the invention shown attached to a visor and holding a plurality of compact discs, keys and a pen.

Referring now to the drawings, FIG. 1 depicts the compact disc storage device 2 attached to a visor 12 (shown in phantom lines). The storage device 2 includes a plurality of pockets 6 interconnected to a support panel 22 which has a top edge, left edge, right edge and a bottom edge. Preferably the support panel 22 is a flat, generally rectangular shaped piece of cardboard, plastic or other material which has an outside surface 30 (see FIG. 2) and an inside surface 32 (see FIGS. 3 and 4). However, the support panel 22 may be oval shaped or any other configuration which accommodates attachment to a visor 12 and storage of CD disks. The outside surface 30 of the support panel 22 faces the driver of the vehicle. The inside surface 32 of the support panel 22 faces the visor, and thus is preferably oriented toward the windshield of the automobile when the visor 12 is in a down position, although it can be connected to the other side of the visor. The plurality of pockets 6 used to store compact discs 4 are positioned on the outside surface 30 of the support panel 22 while the mechanism for attaching the storage device 2 to the visor 12 is interconnected to the inside surface 32 of the support panel 22. Preferably, when the visor is pushed downward the compact discs are displayed to allow the driver to remove or insert a compact disc 4 into the storage device 2. Preferably, when the visor 12 is pushed upward and out of use, the compact discs 4 are concealed from view and thus do not encourage theft.

The pockets 6 are generally aligned to open in the same longitudinal direction, although it is feasible that some pockets 8 may open in alternative positions. For example, some of the pockets may open to the left while other pockets may open to the right or upwards. In a preferred embodiment the pockets 6 all open to the right since most users are right handed. In a preferred embodiment shown in FIG. 2 the pockets 6 are oriented in a slightly diagonal manner from the top edge 46 of the support panel 22 to the bottom edge 48. This configuration maximizes the number of compact discs 4 which may be stored in a confined geometric space while providing easy access to the pockets 6 for removal or insertion of the compact discs 4.

In an alternative embodiment of the present invention an accessories pocket 8 may be interconnected to the support panel 22 and positioned on the outside surface 30 of the support panel 22. The accessories pocket 8 may be used to store keys, garage door openers, credit cards or any other type of small object desired by the driver of an automobile. In a preferred embodiment the accessories pocket 8 is a see-through mesh fabric or transparent material which allows the objects stored in the pocket to be easily seen. Furthermore, the accessories pocket 8 is preferably oriented to be open in the same longitudinal direction as the compact disc storage pockets 6, although the accessories pocket 8 may be designed for opening in a variety of directions depending on the anticipated application. Preferably, the accessories pocket 8 is interconnected to the outside surface 30 of the support panel 22 by stitching at least 2 edges of the accessories pocket 8 to the support panel 22. More preferably at least 3 edges of the accessories pocket are stitched to the outside surface 30 of the support panel 22.

Figure 2:
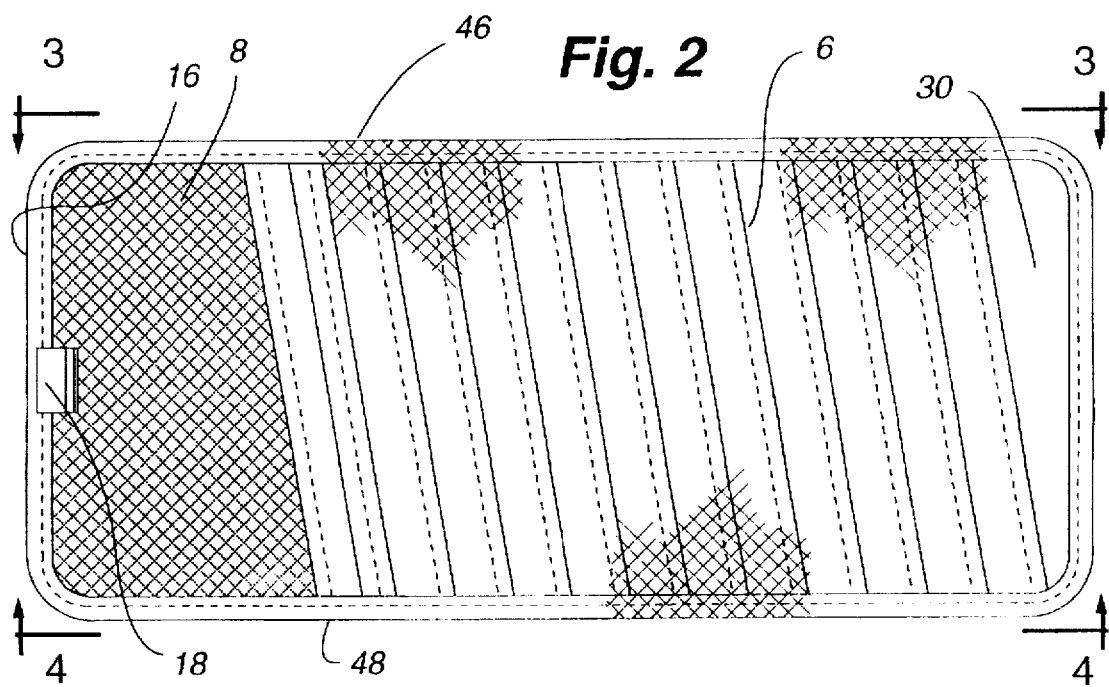
FIG. 2 is a front view of the invention showing the plurality of pockets used for holding compact discs, the accessories pocket, and pen holding loop.
Figure 3:
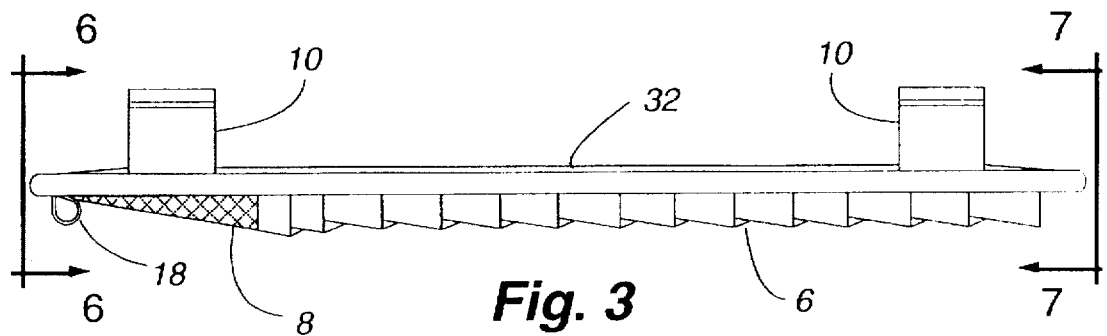
FIG. 3 is a top view of the invention showing the attachment straps and plurality of pockets.
Figure 4:
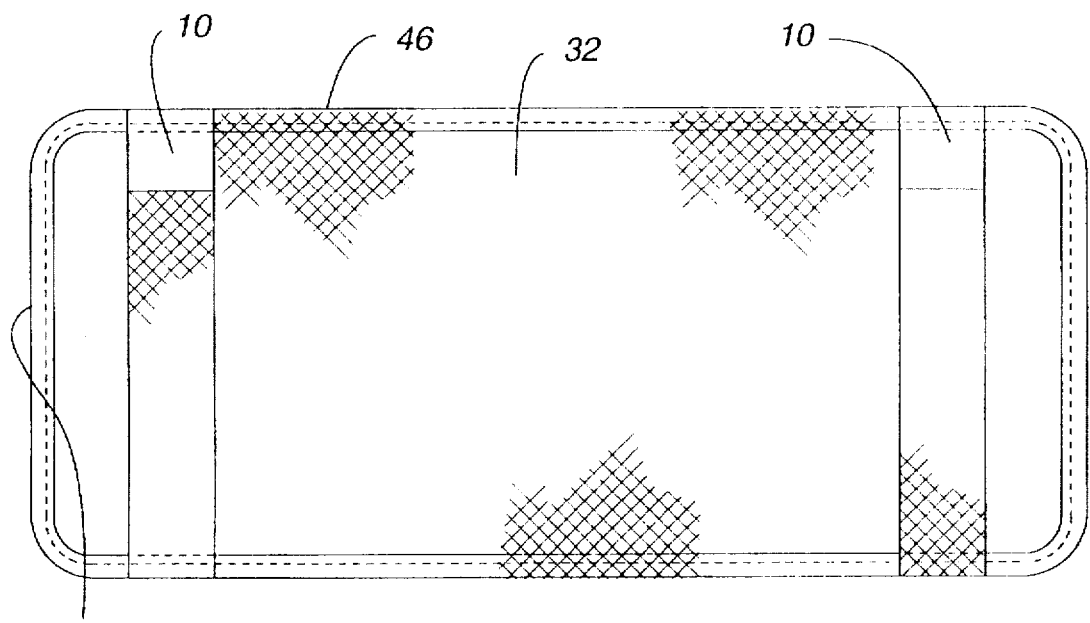
FIG. 4 is a back view of the invention showing the inner surface of the support panel and attachment straps.
Figure 5:
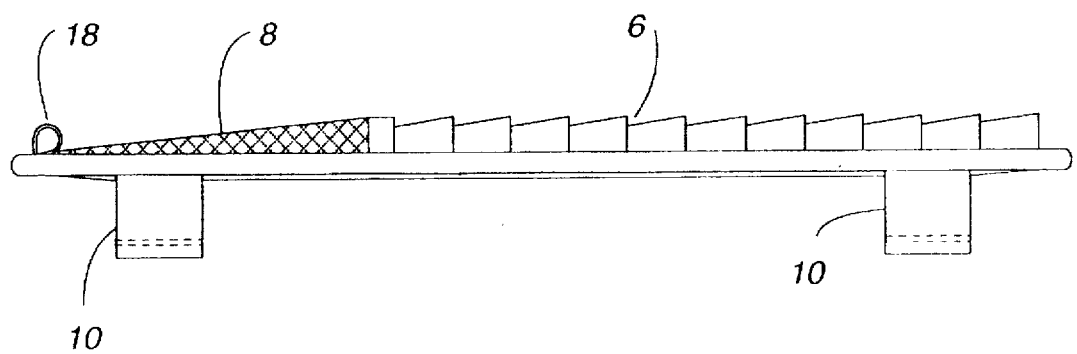
FIG. 5 is a bottom view of the invention showing the plurality of pockets and attachment straps.
Figure 10:
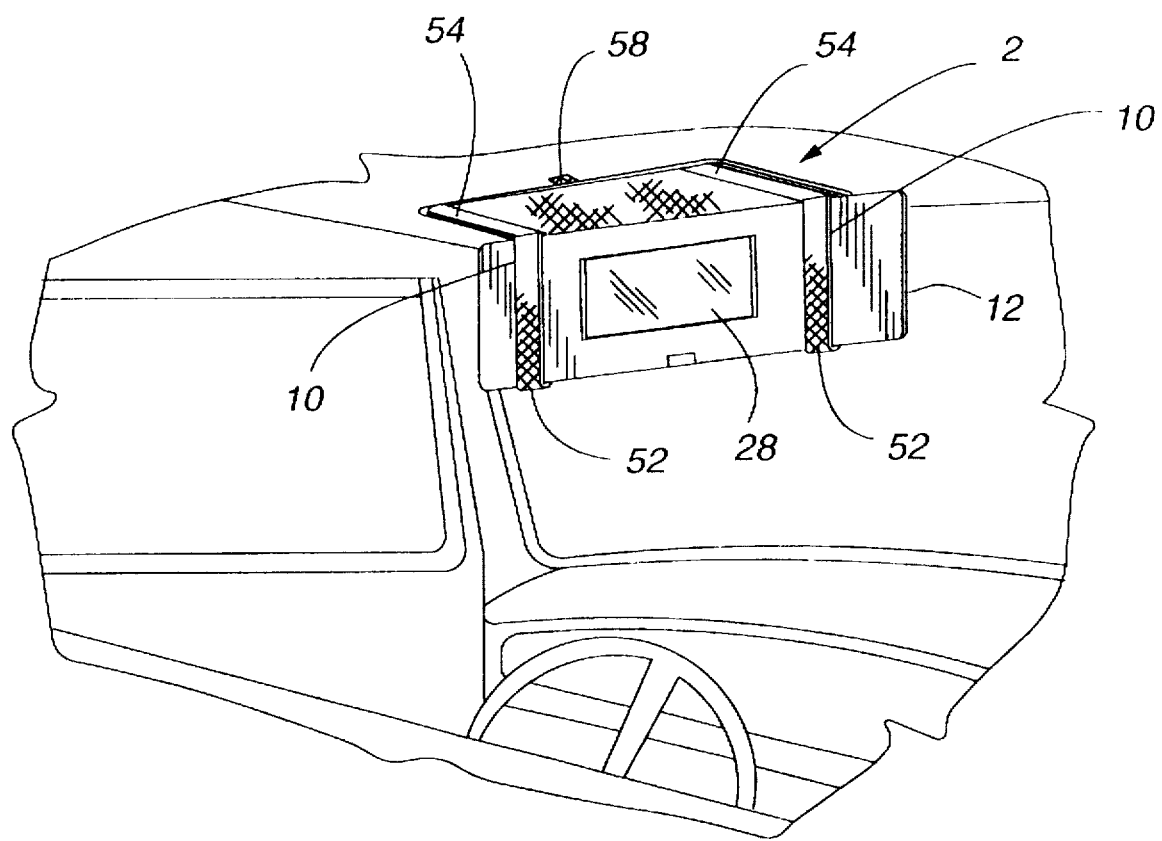
FIG. 10 is a front perspective view of the invention showing a vehicle visor with exposed vanity mirror and the compact disc storage device rotated upwardly and removably interconnected to a ceiling surface in the vehicle.

Referring now to FIG. 2, the compact disc storage pockets are interconnected to the support panel 22 outside surface 30. These pockets 6 may be interconnected to the support panel 22 by heat bonding, gluing or other manner of attachment. More preferably, the pockets 6 are interconnected to the support panel 22 by stitching the ends of the pockets 6 to the support panel top edge 46 and the support panel bottom edge 48. The pockets 6 are most preferably interconnected to the support panel top edge 46 and bottom edge 48 by utilizing a perimeter border material 16 which extends around the entire support panel 22 and holds the pockets 6 securely against the support panel 22. Prior to fixing the top and bottom edges of the pockets 6 to the support panel 22, the "buried" edge (e.g., the unseen left edge in the Figs.) can be fixed to the support panel 22 to prevent a CD from being inserted too far into the pockets 6.

The individual compact disc pockets 6 are generally constructed of a thin, lightweight, material which permits the insertion and removal of one or more compact discs 4 in each of the pockets 6. Furthermore, by utilizing a lightweight, thin material the overall weight and thickness of the storage device 2 can be minimized which permits the device 2 to be positioned more effectively against the ceiling of an automobile. More preferably the pockets 6 are constructed of a material which is non-scratching when in contact with the playing surface of the compact disc 4. This may be a woven or non-woven material, velour or any other type of suitable product.

In a further embodiment of the present invention, a pencil loop 18 may be positioned on the outside surface 30 of the support panel 22 to hold a pen, pencil, tire gauge or other similarly shaped device. Preferably the loop 18 is constructed of an elastic type material with a diameter large enough to receive a standard sized pencil or pen, yet small enough to prevent the pen or pencil from becoming disengaged from the storage device as the visor 12 is pivoted upwards and downwards.

Referring now to FIGS. 3–7, one particular embodiment for attaching the storage device 2 to the visor is shown. This mechanism for attachment includes at least one attachment strap 10 which is interconnected to the inside surface 32 of the support panel near the top edge 46. The attachment strap 10 generally has an exterior surface 34, an interior surface 36, a first end 40 and a second end 50. The first end 40 and second end 50 of the strap have complementary first and second fastening means interconnected on opposing exterior surfaces 34 and interior surfaces 36, thus allowing the straps to adjustably overlap. The fastening devices may be any type of snap, buckle or other suitable hardware which permits the strap 10 to be wrapped around the visor and attached in a secure position. Preferably, however, the complementary fastening devices can be a hook and loop type fastening material 52 such as Velcro® which allows the attachment strap to be tightened and adjusted around a variety of different sized visors 12.

In an alternative embodiment (not shown) the attachment strap 10 may be comprised of two different straps as opposed to one strap, each having a first end interconnected near the top edge 46 of the support panel and the second ends having opposing complementary fastening material 52 which becomes interconnected once the storage device is placed against the visor and the straps adjusted for proper tightening.

In yet another embodiment the attachment strap 10 can be a continuous loop of elastic type material which stretches sufficiently to encircle the visor. This configuration eliminates the need for a fastening device or material to tighten the attachment strap 10 securely around the visor 12.

In a preferred embodiment the attachment device has two positions for securing the storage device 2 to the visor 12. In a first position the storage device 2 is securely positioned against the first side 24 of the visor 12 allowing access to the storage device for the insertion or retrieval of a compact disc. In a second position the storage device 2 is pivoted upwards and away from the first side 24 of the visor 12 to permit the viewing of a vanity mirror 28 or access to any other type of substantially flat object positioned on the first side 24 of the visor 12. The storage device 2, vanity mirror 28 and first side 24 of the visor 12 may be seen in FIG. 8 with the storage device in a second position. In either the first or second positions the attachment mechanism remains interconnected to the visor 24 to alleviate the problem of having to remove the entire storage device 2 from the visor 12 whenever the driver wants to view the vanity mirror.

To permit the storage device 2 to be pivoted between the aforementioned first and second positions, the attachment strap 10 has a complementary fastening material 52 interconnected to the exterior surface 34 of the strap at a location which opposes another complementary fastening material 54 on the inside surface 32 of the support panel 22. Thus when the opposing complementary fastening materials are pushed together, the storage device 2 is secured against the first side 24 of the visor. When the storage device 2 is pivoted upward, the opposing fastening materials are released and the vanity mirror 28 on the first side 24 of the visor 12 may be viewed.

In a further embodiment the storage device 2 may be temporarily secured against the ceiling of an automobile by interconnecting another piece of ceiling fastening material 52 such as Velcro® on the ceiling of the vehicle which is operatively positioned opposite a complementary fastening material located near the bottom edge 48 of the support panel 22.

In yet a further embodiment seen in FIG. 9, an attachment bracket 20 may be used to attach the storage device 2 to the visor 12. The attachment bracket has a first end 42 which is interconnected to the top edge 46 of the support panel 22 and a second end 44 which attaches to an opposing edge of the visor 12. Positioned between the first 42 and second 44 ends is a hinge mechanism 56 which allows the storage device 2 to be rotated upward and away from the visor 12 to permit viewing of the vanity mirror 28 or access to any other relatively flat object positioned on the first side 24 of the visor 12. The hinge may be designed to remain in the selected first or second position until moved by an outside force.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described herein above are further intended to explain best modes known of practicing the invention and to enable others skilled in the art to utilize the invention in such, or other embodiments with various modifications required by the particular application(s) or use(s) of the present invention. It is intended that the appended claims be construed to include alternative embodiments to the extend permitted by the prior art.

The following numbering of the components of the drawings are provided for clarity:

| 02 | compact disc storage device |
| 04 | compact discs |
| 06 | pockets |
| 08 | accessory pocket |
| 10 | attachment strap |
| 12 | visor |
| 14 | visor rod |
| 16 | perimeter border |
| 18 | pencil loop |
| 20 | attachment bracket |
| 22 | support panel |
| 24 | visor first side |
| 26 | visor second side |
| 28 | vanity mirror |
| 30 | support panel outside surface |
| 32 | support panel inside surface |
| 34 | attachment strap exterior surface |
| 36 | attachment strap interior surface |
| 38 | support panel fastening member |
| 40 | attachment strap first end |
| 42 | attachment bracket first end |
| 44 | attachment bracket second end |
| 46 | support panel top edge |
| 48 | support panel bottom edge |
| 50 | attachment strap second end |
| 52 | fastening material |
| 54 | fastening material |
| 56 | attachment bracket hinge |
| 58 | ceiling fastening material |

What is claimed is:

1. A compact disc storage device for attachment to a vehicle visor, said vehicle visor having a first side and a second side, comprising:

(a) a substantially flat support panel having opposed outer and inner surfaces;

(b) a plurality of non-rigid pockets positioned on said outer surface of said support panel, each of said pockets having a sufficient dimension to receive at least one compact disc; and (c) attachment means for securing said storage device to said visor, said attachment means capable of moving between a first position and a second position, wherein in said first position said inner surface of said support panel is securely positioned against said first side of said visor and in said second position said support panel is pivoted upwards and away from said visor to expose said first side of said visor, and wherein in both said first and second positions said carrying device remains operatively interconnected to said visor in a position which does not obstruct a user's field of vision.

2. The storage device of claim 1, further comprising an accessories pocket interconnected to said support panel and positioned on said outer surface of said support panel.

3. The storage device of claim 2, wherein said accessories pocket is comprised of a see-through mesh material.

4. The storage device of claim 1, further comprising a first complementary fastening means interconnected to said outer surface of said support panel and a second complementary fastening means for interconnecting to an interior ceiling surface of an automobile, wherein when said storage device is pivoted upward in said second position said first and said second complementary fastening means engage to temporarily hold said storage device in an upward position.

5. The storage device of claim 1, wherein said attachment means further comprises at least one strap interconnected to said support panel proximate a top edge, said strap having a first end, a second end, an exterior surface, an interior surface and a sufficient length to encircle said visor, said strap having first and second complementary fastening means interconnected on said first end and said second end for removable engagement and a third complementary fastening means operatively interconnected and positioned on the exterior surface of said strap between said first end and said second end for temporary attachment to a fourth complementary fastening means interconnected to said interior surface of said support panel.

6. The storage device of claim 5, wherein said fastening means is comprised of a hook and loop type material.

7. The storage device of claim 1, wherein said attachment means comprises at least one continuous loop interconnected to said inner surface of said support panel proximate said top edge, said continuous loop capable of extending completely around said visor and said continuous loop having an exterior surface with first complementary fastening means positioned for contact with second complementary fastening means interconnected to said inner surface of said support panel, wherein said support panel can be selectively secured or released from attachment to said exterior surface of said continuous loop.

8. The storage device of claim 1, wherein said attachment means comprises at least one pair of opposing straps, each of said straps having a first end, a second end, an exterior surface and an interior surface, said first ends interconnected to said support panel proximate said top edge and said second ends of said opposing straps comprising a first fastening means for mating with a second fastening means of said opposing strap, said opposing straps having a sufficient length to encircle said visor.

9. The storage device of claim 8, wherein one of said opposing straps further comprise third fastening means interconnected to said exterior surface for removably attaching to a fourth fastening means interconnected to said inner surface of said support panel, wherein when said storage device is in said first position said storage device is secured against said first side of said visor.

10. The storage device of claim 1, wherein said attachment means comprises a hingable clamp with a first end and a second end, said first end being interconnected proximate to a top edge of said support panel and said second end operatively sized for removable interconnection to a corresponding edge of said visor.

11. The storage device of claim 1, wherein each of said pockets have an opening oriented in the same longitudinal direction for insertion and removal of said compact discs.

12. The storage device of claim 1, wherein said plurality of non-rigid pockets are interconnected to said support panel by stitching a perimeter border material around the perimeter edges of said support panel.

13. The storage device of claim 12, wherein said pockets are constructed with a substantially non-scratching material in contact with said playing surface of said compact discs.

14. The storage device of claim 12, wherein said attachment means comprises:

(a) at least one strap having a first end, a second end, an interior surface and an exterior surface, said strap interconnected to said inner surface of said support panel proximate said top edge, said first end of said strap comprising a first complementary fastening means for mating with a second complementary fastening means interconnected to said second end, said strap capable of encircling said visor, and at least a third complementary fastening means interconnected to said exterior surface between said first and said second ends for selectively attaching to a fourth complementary fastening means operatively positioned on said inner surface of said support panel.

15. The storage device of claim 1, further comprising a loop interconnected to said outside surface of said support panel, said loop sized to receive and hold a pencil or pen.

16. The storage device of claim 1, wherein said pockets having an opening biased at an angle that is not 90° relative to the longitudinal axis of said storage device.

17. The storage device of claim 1, wherein said support panel is substantially rectangular with four perimeter edges including a top edge, a bottom edge, a right edge and a left edge.

18. A compact disc storage device for use with a visor having a first side and a second side, said compact discs having a playing surface, a graphics surface, an exterior edge and a center aperture, comprising:

(a) a substantially flat support panel having opposed outer and inner surfaces and four perimeter edges including a top edge, bottom edge, right edge and left edge;

(b) a plurality of non-rigid pockets interconnected to said support panel and positioned on the outer surface of said support panel, each of said pockets oriented for opening in the same longitudinal direction and sized to receive at least one compact disc while exposing at least a portion of said exterior edge of said compact disc for grasping;

(c) at least one flexible accessory storage pocket positioned on said outer surface of said support panel, said pocket interconnected to said support panel on at least two of said exterior edges of said support panel; and (d) attachment means interconnected to said support panel and positioned on said inner surface of said support panel, said attachment means capable of moving between a first position and a second position, wherein in said first position said inner surface of said support panel is positioned against said first side of said visor and in said second position said storage device is pivoted proximate said top edge of said support panel and extended upward and away from said visor to permit access to said first side of said visor, wherein in both said first and said second positions said carrying device remains operatively interconnected to said visor in a position which does not obstruct a user's field of vision.

19. The storage device of claim 18, wherein said attachment means comprises at least one continuous loop interconnected to said inner surface of said support panel proximate said top edge, said continuous loop capable of extending completely around said visor and said continuous loop having an exterior surface with first complementary fastening means positioned for contact with second complementary fastening means interconnected to said inner surface of said support panel, wherein said support panel can be selectively secured or released from attachment to said exterior surface of said continuous loop.

20. The attachment means of claim 19, wherein said continuous loop is comprised of an elastic material.

21. A method for positioning a compact disc storage device in one of two different positions while the device is operably interconnected to a visor in an automobile, said visor having a first side and a second side, comprising the steps of:

positioning said device in a first position wherein said device is securely overlapping said first side of said visor and compact discs stored in said storage device may be accessed for insertion and removal; and pivoting said storage-device upward and away from said visor, wherein said first side of said visor is exposed for access while said storage device remains interconnected to said visor of said automobile in a position which does not obstruct a driver's field of vision.

22. The method of claim 21, wherein said method for positioning said storage device from said first position to said second position comprises the step of releasing a first complementary fastening means interconnected to said storage device and a second complementary fastening means interconnected to said visor.

23. The method of claim 21, wherein said step of positioning comprises encircling said visor with at least one strap, said strap having a first complementary fastening means for engaging a second complementary fastening means.

24. A compact disc storage device for attachment to a vehicle visor, said vehicle visor having a first side and a second side, comprising:

(a) a substantially flat support panel having opposed outer and inner surfaces;

(b) a plurality of non-rigid pockets operatively positioned on said outer surface of said support panel, at least some of said pockets having a sufficient dimension to receive at least one compact disc;

(c) attachment means for securing said storage device to said vehicle visor; and (d) pivot means for rotating said substantially flat support panel between a first position and a second position, wherein in said first position said inner surface of said support panel is securely positioned against said first side of said visor and in said second position said support panel is pivoted upwards and away from said visor to expose said first side of said visor, wherein in both said first position and said second position said carrying device remains operatively interconnected to said visor in a position which does not obstruct a user's field of vision.

25. The compact disc storage device of claim 24, wherein said pivot means comprises at least one substantially continuous strap positioned around said vehicle visor and interconnected to said substantially flat support panel proximate to an upper edge of said support panel, wherein said panel can rotate upwardly at said location where said strap is interconnected to said support panel.

26. The compact disc storage device of claim 24, wherein said attachment means comprises at least one strap substantially encircling said vehicle visor and interconnected to said support panel.

* * * * *